US007012961B2

(12) United States Patent
Rhee et al.

(10) Patent No.: US 7,012,961 B2
(45) Date of Patent: Mar. 14, 2006

(54) METHOD AND APPARATUS FOR DECODING IMAGE HAVING FORMAT FOR DIGITAL CAMCORDER

(75) Inventors: Seung Hyeon Rhee, Seoul (KR); Byeong Chan Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 612 days.

(21) Appl. No.: 10/039,263

(22) Filed: Jan. 3, 2002

(65) Prior Publication Data

US 2002/0090031 A1 Jul. 11, 2002

(30) Foreign Application Priority Data

Jan. 5, 2001 (KR) .................................. 2001-608

(51) Int. Cl.
*H04N 7/12* (2006.01)

(52) U.S. Cl. ................................................ 375/240.25

(58) Field of Classification Search ................ 348/400, 348/395, 403, 407, 390, 387, 404, 419; 375/240.25, 375/240.16, 240.12, 240.03; 382/246, 247, 382/239, 233
See application file for complete search history.

(56) References Cited

U.S. PATENT DOCUMENTS 6,389,171 B1 * 5/2002 Washington ................ 382/233
6,650,707 B1 * 11/2003 Youn et al. ............ 375/240.12
6,654,544 B1 * 11/2003 Suzuki et al. ............... 386/112
6,668,021 B1 * 12/2003 Shimizu et al. .......... 375/240.2

* cited by examiner

*Primary Examiner*—Vu Le
*Assistant Examiner*—Behrooz Senfi
(74) *Attorney, Agent, or Firm*—Lee, Hong, Degerman, Kang & Schmadeka

(57) ABSTRACT

A method and apparatus for decoding a bit stream encoded in a digital camcorder (DV) format is disclosed. The method includes a preprocessing step of detecting a position of an EOB (end of block) of respective DCT blocks using length information of a variable-length code of a bit stream encoded in the DV format, and a step of redefining a processing order of the DCT blocks according to the position of the EOB detected at the preprocessing step, and performing a variable-length decoding with respect to the respective DCT blocks in the redefined processing order. The blocks that can be processed are preferentially transmitted according to the detection of the EOB in transmitting the bit stream to the variable-length decoder, and thus the delay that may be produced when the whole block is sequentially processed can be minimized. Also, since the decoding is performed through redefining of the processing order of the DCT blocks, a storage device only for one DCT block can be used.

19 Claims, 6 Drawing Sheets

(a)

| | | | | | |
|---|---|---|---|---|---|
| DCT0 incomplete | DCT1 complete | DCT2 complete | DCT3 incomplete | DCT4 complete | DCT5 complete |

(b)

METHOD AND APPARATUS FOR DECODING IMAGE HAVING FORMAT FOR DIGITAL CAMCORDER

BACKGROUND OF THE INVENTION

1. Field of the Invention

The present invention relates to a method and apparatus for decoding an image having a format for a digital video camera so called a digital camcorder (DV), that can minimize the memory capacity required for implementing a variable-length decoder and the operation time for searching blocks when decoding bit streams encoded in a format for the digital camcorder (DV).

2. Background of the Related Art

Recently, the use of a digital image has been expanded. Especially, a moving image is generally stored and transmitted after being compressed and encoded since lots of resources are required for storing and transmitting the moving image. As the standard widely used for this purpose, there exist an MPEG (moving picture experts group)-1 and an MPEG-2 based on a discrete cosine transform (DCT) and motion estimation and compensation technique, which are actively applied to a video compact disc (CD), a digital versatile disc (DVD), a digital television, etc. Currently, they are substituted for the existing analog video reproducing appliances for home use, while a digital camcorder (DV) is substituted for a camcorder that is the existing analog recording and reproducing appliance.

The digital camcorder requires an encoder having the complicated standard of an MPEG series, and this causes the application of such an encoder to be limited to broadcasting appliances. Also, the digital camcorder is designed to have a different construction from the MPEG considering the characteristics in that both an encoder and a decoder should be included in the camcorder. Especially, since a motion estimation and compensation section generally used in the standard of the MPEG and so on requires a high-order operation amount, it is difficult to mount the motion estimation and compensation section onto a general home appliance. This causes the compression and encoding standard of a simple structure that does not perform the motion estimation and compensation to be proposed.

This encoding standard for the digital camcorder is disclosed in "IEC 61834-2 Recording—Helical-scan digital video cassette recording system using 6.35 mm magnetic tape for consumer use (525-60, 625-50, 1125-60, and 1250-50 systems)—Part 2: SD format for 525-60 and 625-50 systems." This standard is generally called a DV format.

As the use of the digital camcorder adopting the DV format is spreading, there has been an increasing demand for an additional function for processing data of the DV format in a home video appliance such as a digital television receiver as well as the function of the digital camcorder itself.

According to the DV format, the whole image is divided into two types of macro blocks as shown in FIGS. 1 and 2. The 525-60 system uses either of the two types of macro blocks in accordance with the position in the image, while 626-50 system uses only the type of macro blocks in FIG. 2. As is common to the two types of macro blocks, DCT blocks DCT0~DCT5 for four luminance signals Y0, Y1, Y2, and Y3 and two chrominance signals CR and CB are sequentially encoded as shown in FIG. 3. The respective DCT block is a unit block for performing the DCT, and is composed of 8*8 pixels. At this time, in distinction from the compression and encoding standard of the MPEG series, a fixed bit amount is allocated to each video segment in the DV format for the strict management thereof.

That is, as shown in FIG. 4, one video segment is composed of 5 macro blocks. Thus, 30 DCT blocks constitute one video segment.

Also, since a trick-mode reproducing function is important according to the characteristic of the camcorder, a DC coefficient of the respective block is written in a fixed position for a high-speed forward/reverse reproduction. At this time, AC coefficients are sequentially stored in the remaining places except for the place where the DC coefficient is written.

A general encoding process for storing the AC coefficients is performed as follows.

(a) The bit stream obtained as a result of compression and encoding of the respective DCT blocks is sequentially written in a basic area allocated in the respective DCT block. The basic area allocates 14 bytes to a luminance-component block, and 10 bytes to a chrominance-component block. At this time, if the bit stream exceeds the allocated basic area, the encoding of the corresponding DCT block is stopped, and the next DCT block is processed.

(b) The step (a) is performed with respect to 30 DCT blocks.

(c) The processing of the DCT block stopped at the step (a) in the respective macro block continues. That is, the excess portion of the DCT block that exceeds the basic area at the step (a) is stored in a surplus portion of the basic area allocated to another DCT block whose encoding is completed.

(d) The step (c) is repeatedly performed with respect to 5 macro blocks until the excess portion or the surplus portion in the respective macro block vanishes completely. As a result, one part of the 5 macro blocks which constitute the video segment has the surplus portion, and the other part has the excess portion.

(e) The excess portion of the macro block that exceeds the basic area is stored in the surplus portion of the basic area allocated to another macro block. Here, the basic area allocated to the macro block means the sum of basic areas allocated to the DCT blocks included in the respective macro block.

(f) The step (e) is repeatedly performed with respect to the whole region of the video segment until the excess portion or the surplus portion vanishes completely.

The decoding of the bit streams encoded as described above is generally performed according to the following order.

(a) The variable-length decoding is sequentially performed with respect to the DCT blocks in the respective macro block. The decoded data is sequentially stored in a storage device. At this time, if an end of block (EOB) of the DCT block is not transmitted at a time point when all the data of the basic area allocated to the corresponding DCT block is decoded, the decoding of the corresponding DCT block is stopped, and the next DCT block is decoded.

(b) The step (a) is performed with respect to 30 DCT blocks.

(c) The decoding of the DCT block in the macro block, of which the EOB is not transmitted, i.e., the DCT block that is judged to exceed the basic area allocated at the step (a), continues through the readout of the bit stream from the surplus portion of the basic area allocated to the DCT block of which the EOB is transmitted, i.e., the DCT block whose decoding is completed.

(d) The step (c) is continuously performed until the surplus portion or the excess portion in the macro block vanishes completely.

(e) The decoding of the 6 DCT blocks in the macro block whose decoding is not completed continues through the readout of the bit stream from the surplus portion of the basic area allocated to the macro block in which the decoding of the 6 DCT blocks is completed.

(f) The step (e) is repeatedly performed until the decoding of all the macro blocks is completed. In a normal condition, the completion of decoding of the video segment means that the EOBs of the 30 DCT blocks are detected.

Conventionally, the complicated process as described above is performed for the decoding of the video segment, and this causes the design of the storage device and control logic circuit to exert an important effect upon the cost and performance of the system.

Specifically, since the decoding process is performed in the unit of a video segment, a storage device for storing a bit stream for one video segment is basically required, and its size should be of (14*4+10*2)*8*5=3,040 bits as defined in the standard. In practice, a double buffer is used for the real-time process, and thus two storage devices are necessary.

The capacity of the storage device required for the following process is determined according to the implementation method of the variable-length decoder. At this time, in case of implementing the variable-length decoder according to the above method, a storage device for storing DCT coefficients for two video segments, i.e., 60 DCT blocks, is required for the real-time process since an inverse DCT (IDCT) can be performed after the variable-length decoding is completed in all.

Since 64 DCT coefficients are included in one DCT block, the capacity of the storage device will be of 30,720 bits. Also, since the decoding process should be repeatedly performed in the unit of a DCT block, a macro block, and a video segment, a temporary storage device for storing the bit stream obtained as a result of performing the respective steps also requires the size of one video segment, which is the same size as the storage device for storing the input bit stream, i.e., 3,080 bits.

Also, in case of the DCT block that exceeds the allocated basic area, the bit stream of another DCT block whose decoding is completed should be searched in order to read out its own bit stream stored in the surplus space of another DCT block. This requires a long operation time.

SUMMARY OF THE INVENTION

Accordingly, the present invention is directed to a method and apparatus for decoding an image of a DV format that substantially obviates one or more problems due to limitations and disadvantages of the related art.

An object of the present invention is to provide a method and apparatus for decoding an image of a DV format that can perform the variable-length decoding and the IDCT within a given time by judging whether respective DCT blocks can be decoded to a bit stream allocated with a fixed size at the front end of the variable-length decoder and preferentially decoding the DCT blocks judged to be able to be decoded.

Another object of the present invention is to provide a method and apparatus for decoding an image of a DV format that removes the necessity of a separate storage device for temporarily storing a result of decoding in a basic area in case that the EOB of a DCT block is positioned outside the basic area by redefining the processing order of the blocks.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of decoding an image of a DV (digital camcorder) format includes a preprocessing step of detecting a position of an EOB (end of block) of a respective DCT (discrete cosine transform) block using length information of a variable-length code of a bit stream encoded in the DV format, and a step of redefining a processing order of the DCT blocks according to the position of the EOB detected at the preprocessing step, and performing a variable-length decoding with respect to the respective DCT blocks in the redefined processing order.

Preferably, the variable-length decoding step performs the variable-length decoding in the order of all complete DCT blocks in complete macro blocks, all incomplete DCT blocks in complete macro blocks, all complete DCT blocks in incomplete macro blocks, and all incomplete DCT blocks in incomplete macro blocks in a corresponding video segment in accordance with contents of a DCT block index vector and a macro block index vector.

In another aspect of the present invention, an apparatus for decoding an image of a DV (digital camcorder) format includes a preprocessor for detecting a position of an EOB (end of block) of respective DCT (discrete cosine transform) blocks using length information of a variable-length code of a bit stream encoded in the DV format, a variable-length decoding section for redefining a processing order of the DCT blocks according to the position of the EOB detected by the preprocessor, and performing a variable-length decoding with respect to the respective DCT blocks in the redefined processing order, a storage device for receiving and outputting to the preprocessor the encoded bit stream, and storing and outputting the EOB of the respective DCT blocks outputted from the preprocessor and DCT coefficients variable-length-decoded by the variable-length decoding section, and a control section having built-in DCT block index vectors, macro block index vectors, and a bit address register to redefine a variable-length decoding order of the variable-length decoding section, and outputting to the storage device the number of the respective DCT blocks to be processed, a read signal, and a write signal in accordance with values of the DCT block index vectors.

Preferably, the preprocessor prepares a simple code table according to a length stored in a variable-length code table of the variable-length decoding section, and performs a pseudo-variable-length decoding accordingly.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

In the present invention, among DCT blocks DCT0~DCT5, a basic area of 14 bytes is allocated to four luminance components for the DCT blocks DCT0~DCT3, and a basic area of 10 bytes is allocated to two chrominance components for the DCT blocks DCT4 and DCT5, respectively.

For convenience' sake in explanation, the DCT block whose end of block (EOB) is produced within the above range, i.e., the DCT block whose decoding is completed, is called a 'complete DCT block', and the contrary DCT block is called an 'incomplete DCT block'.

Meanwhile, a basic area of 14*4+10*2=76 bytes is allocated to macro blocks MB0~MB4, respectively.

Also, for convenience' sake in explanation, the macro block where all the EOBs of 6 DCT blocks are produced within the above range, i.e., the macro block whose decoding is completed, is called a 'complete macro block', and the contrary macro block is called an 'incomplete macro block'. Since even the EOB of an incomplete DCT block may be produced from a surplus bit stream of the basic area allocated to a different complete DCT block, the complete macro block is not always composed of 6 complete DCT blocks.

Figure 5:
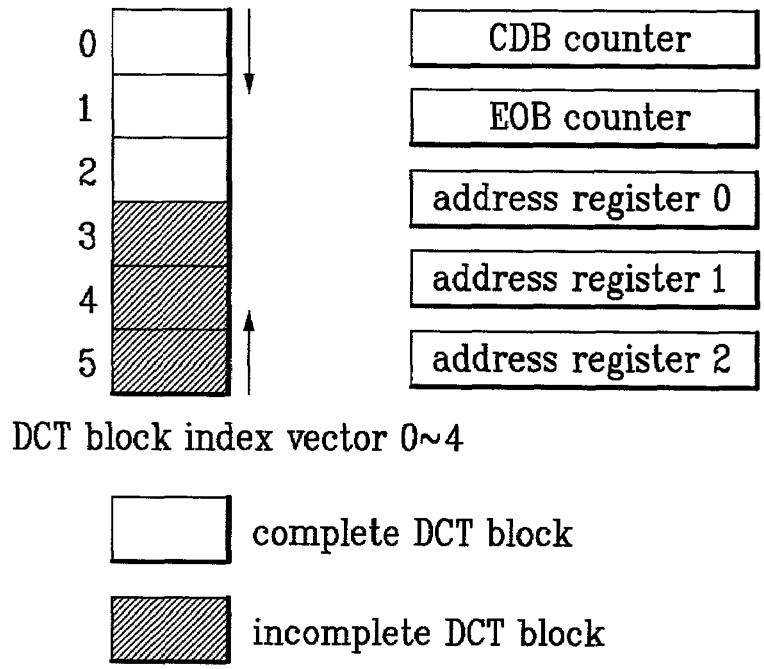
FIG. 5 is a view illustrating a DCT block index vector, CDB counter, EOB counter, address register 0, address register 1, and address register 2 used for separating and rearranging complete DCT blocks and incomplete DCT blocks according to the present invention.

Meanwhile, in order to separate and rearrange the complete DCT blocks and the incomplete DCT blocks, DCT block index vectors as shown in FIG. 5 are used. Specifically, 5 DCT block index vectors are used for each macro block, and the respective size, i.e., the number of elements in the vector, corresponds to the number of DCT blocks in the macro block, i.e., 6. The DCT block number is written in the respective element.

An address register 0 has the number of the first complete DCT block having a surplus bit stream, and is used for initializing an address register 1. Also, the initial value of the address register 0 is 0. The address register 1 and address register 2 have values in the range of 0 to 5 that indicate the elements of the DCT block index vector. The initial value of the address register 2 is 5. That is, in the initial state, the address register 1 and the address register 2 have 0 and 5, respectively, and thereafter, the result of initialization of the address register 1 may be a different value according to the value of the address register 0. Also, a complete DCT block (CDB) counter and an end of block (EOB) counter have the number of complete DCT blocks in the macro block and the number of EOBs, respectively, and their initial values are all 0. The complete DCT block always includes the EOB. However, since the EOB of the incomplete DCT block may be produced from the surplus bit stream of the basic area allocated to a different complete DCT block, the value of the EOB counter is always the same as or larger than the value of the CDB counter.

Figure 6:
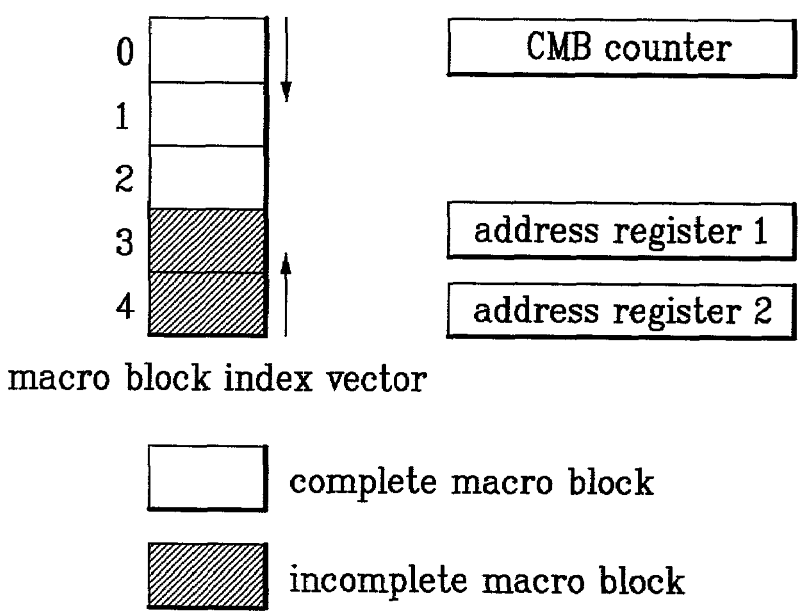
FIG. 6 is a view illustrating a DCT block index vector, CMB counter, address register 1, and address register 2 used for separating and rearranging complete macro blocks and incomplete macro blocks according to the present invention.

Also, in order to separate and rearrange the complete macro blocks and the incomplete macro blocks, a macro block index vector as shown in FIG. 6 is used. At this time, since the number of macro blocks in the video segment is 5, the size of the macro block index vector, i.e., the number of elements in the vector, is also 5. An address register 1 and an address register 2 have values in the range of 0 to 4 that indicate elements of the macro block index vector, and their initial values are 0 and 4, respectively. A complete macro block (CMB) counter has the number of complete macro blocks in the video segment, and its initial value is o.

Figure 7:
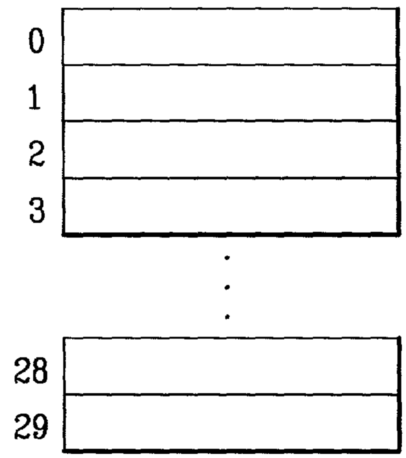
FIG. 7 is a view illustrating a bit address register used for storing bit addresses whose variable-length decoding is stopped according to the present invention.

Also, in order to store bit addresses where the variable-length decoding is stopped, bit address registers as shown in FIG. 7 are used. The bit address register is allocated to each DCT block, and thus 30 bit address registers are used for one video segment. In case of the incomplete DCT block, the bit address register stores the position where the variable-length decoding is stopped, i.e., the position where the decoding is resumed during the next decoding process, while in case that the EOB is detected, it stores the next bit address, i.e., the start position of the surplus bit stream.

The method of decoding an image signal of a DV format as constructed above according to the present invention includes a preprocessing (pseudo-variable-length decoding) step and a variable-length decoding step.

Hereinafter, the preprocessing step and the variable-length decoding step will be explained in order.

1. The Preprocessing (i.e., Pseudo-Variable-Length Decoding) Step

The decoding at the preprocessing step means that the decoding is not actually performed, but the position of the EOB of the respective DCT block is detected using length information of the variable-length code.

(a) Values of the DCT address register 1, address register 2, CDB counter, and EOB counter of all the DCT block index vectors, and values of the MB address register 1, address register 2, and CMB counter of the macro block index vector are initialized.

(b) If the DCT block is the complete DCT block, the position of the bit following the EOB is written in the bit address register of FIG. 7. Then, the corresponding DCT block number is written in the element of the DCT block index vector of FIG. 5 that is indicated by the address register 1, and then the value of the address register 1 is increased. If the DCT block is the incomplete DCT block, the position where the decoding is stopped is written in the bit address register of FIG. 7. Then, the corresponding DCT block number is written in the element of the DCT block index vector of FIG. 5 that is indicated by the address register 2, and then the value of the address register 2 is decreased.

Figure 1:
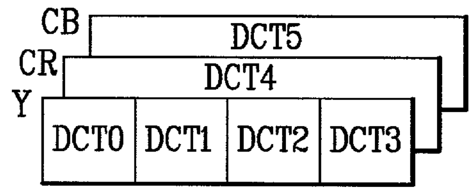
FIG. 1 is a view illustrating an example of the process of dividing the whole image of a general DV format into macro blocks.
Figure 2:
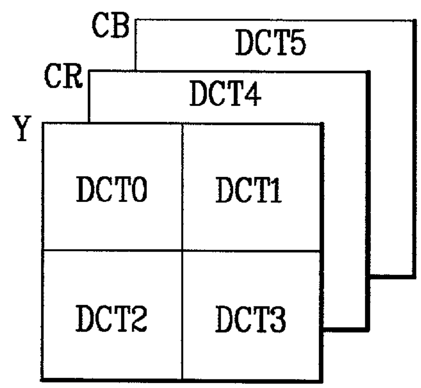
FIG. 2 is a view illustrating another example of the process of dividing the whole image of a general DV format into macro blocks.
Figure 3:
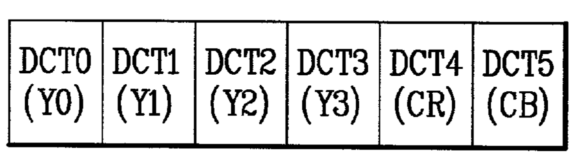
FIG. 3 is a view illustrating an example of the macro block of FIGS. 1 and 2 that is composed of DCT blocks DCT0~DCT5 for four luminance signals and two chrominance signals.
Figure 4:
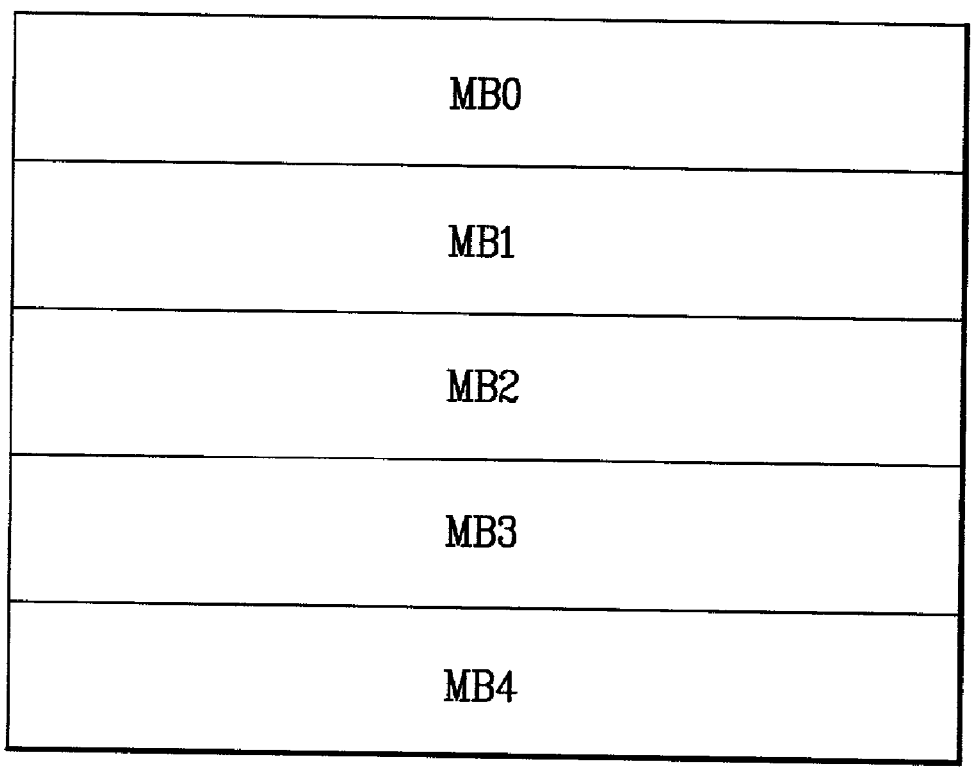
FIG. 4 is a view illustrating an example of a general video segment composed of 5 macro blocks MBO~MB4.
Figure 8:
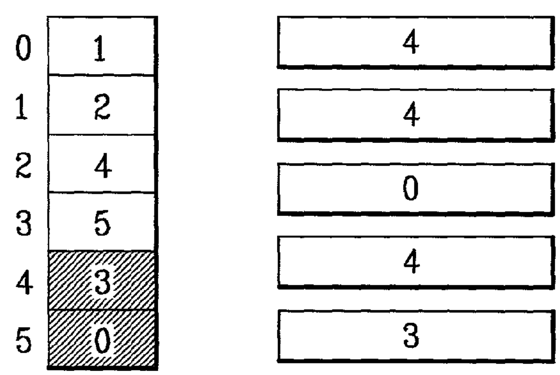
FIG. 8A is a view illustrating a complete/incomplete DCT block judgment result of 6 DCT blocks in a macro block of FIG. 3 according to the present invention.
FIG. 8B is a view illustrating an example of a DCT block index vector prepared on the basis of FIG. 8A.

(c) The step (a) is sequentially performed with respect to 6 DCT blocks in the macro block. FIGS. 8A and 8B exemplify this process. That is, FIG. 8A shows a result of complete/incomplete DCT judgment of 6 DCT blocks in a macro block as shown in FIG. 3, and FIG. 8B shows DCT block index vectors prepared based on this result of judgment.

(d) If the value of the CDB counter is smaller than 6, the values of the DCT address register 1 and the address register 2 are reinitialized, and the processing of the incomplete DCT blocks is resumed. At this time, the address register 2 has the address of the vector element that has the number of the incomplete DCT block to be processed, and the address register 1 has the address of the vector element that has the number of the complete DCT block from which the bit stream to be used for decoding the incomplete DCT block is read out. Also, the bit position in which the decoding of the incomplete DCT block is to be resumed is read out from the bit address register of the incomplete DCT block, and the position in which the bit stream is to be read out from the complete DCT block is read out from the bit address register of the complete DCT block. In other words, the decoding is resumed in the position indicated by the bit address register of the incomplete DCT block, and over the basic area, the bits are subsequently read out in the position indicated by the bit address register of the complete DCT block.

(e) If the EOB is detected during performing the step (d), the value of the EOB counter is increased. Thereafter, if the increased value of the EOB counter is smaller than 6, the value of the address register 2 is decreased, and then a new incomplete DCT block is selected with reference to the element indicated by the value of the address register 2. Then, the decoding of the incomplete DCT block continues. If the increased value of the EOB counter becomes 6, it means that the present macro block is the complete macro block. In this case, the number of the present macro block is written in the element indicated by the MB address register 1 of FIG. 6, and the value of the address register 1 and the value of the CMB counter are increased in order.

(f) If the surplus bit stream of the basic area allocated to the complete DCT block vanishes completely during performing the step (d), the value of the DCT address register 1 is increased. Thereafter, if the increased value is smaller than the value of the CDB counter, a new complete DCT block is selected with reference to the element indicated by the value of the DCT address register 1, and the decoding continues using the surplus bit stream of the basic area allocated thereto. If the increased value of the DCT address register 1 is the same as the value of the CDB counter, it means that the present macro block is the incomplete macro block. In this case, the number of the present macro block is written in the element indicated by the MB address register 2 of FIG. 6, and the value of the address register 2 is decreased.

(g) The above steps (b)~(f) are performed with respect to the next macro block.

2. Variable-Length Decoding Step

The decoding at the variable-length decoding step means that the variable-length decoding is actually performed. but the position of the EOB of the respective DCT block is detected using length information of the variable-length code. At this time, the order of decoding is determined according to the contents of the macro block index vector and the DCT block index vector constructed at the step 1 instead of the general sequential process. The element indicated by the MB address register 1 of the macro block index vector constructed at the step 1 has the number of the complete macro block, and the element indicated by the DCT address register 1 of the DCT block index vector corresponding to the macro block has the number of the complete DCT block. In case of preferentially processing the DCT block, the variable-length decoding is possible without any waiting time for searching the EOB outside the basic area. Thus, only a DCT-counting storage device for one DCT block is required instead of a DCT-counting storage device for the whole video segment, i.e., 30 DCT blocks.

(a) The DCT address register 0, address register 1, and address register 2, and EOB counter of all DCT block index vectors, and the address register 1 and address register 2 of the macro block index vector are initialized.

(b) If a completed DCT block is processed, the value of the EOB counter is increased, the value of the address register 1 of the DCT block index vector is increased, and a new complete DCT block determined by this value is processed.

(c) The step (b) is repeated until the value of the address register 1 coincides with the value of the CDB counter.

(d) If the step (c) is performed, the value of the address register 1 is initialized, and the incomplete DCT block is processed by the value of the address register 2. At this time, the bit stream is read out with reference to the value of the bit address register of the incomplete DCT block to be processed, and if the bit stream of the basic area vanishes completely, the bit stream is subsequently read out from the position.

(e) If the bit stream of the basic area allocated to the complete DCT block vanishes completely, the values of the address register 0 and the address register 1 are increased, and the next complete DCT block is selected by the value of a new address register 1.

(f) If an incomplete DCT block is processed, i.e., if the EOB is detected, the value of the EOB counter is increased, the value of the address register 2 is decreased, and a new incomplete DCT block determined by this value is finished.

(g) The above steps (d)~(f) are performed until the value of the EOB counter becomes 6, i.e., until the process of the present complete macro block is completed. If the above steps are completed, the position of the next bit where the final EOB is found is written in the bit address register of the present complete DCT block.

(h) If the process of a complete macro block is completed through the step (g), the value of the address register 1 of the macro block index vector is increased, and if the value is smaller than the value of the CMB counter, the complete macro block corresponding to the number of the macro block of the element indicated by the value of the address register 1 is processed.

(i) The above steps (b)~(h) are repeated until the value of the address register 1 of the macro block index vector coincides with the value of the CMB counter, i.e., until all the process of the complete macro block is completed.

(j) If the step (i) is performed, the address register 1 of the macro block index vector is initialized. Then, the value of the address register 1 of every DCT block index vector is initialized. At this time, the address register 0 used for the initialization may have a value that is not 0 through the step (e).

(k) The incomplete macro block that corresponds to the number of the macro block of the element indicated by the value of the address register 2 is processed. In processing the respective incomplete macro blocks, the complete DCT blocks are preferentially processed through the same method as the steps (b) and (c).

(l) The incomplete DCT blocks are processed in the same method as the steps (d)~(f).

(m) If the value of the address register 1 of the DCT block index vector is the same as the value of the CDB counter, the value of the address register 1 of the macro block index vector is increased. Then, if the increased value is smaller than the value of the CMB counter, a new complete macro block is selected, and a new complete DCT block is selected with reference to the value of the address register 1 of the DCT block index vector allocated to the new complete macro block to continue the decoding.

(n) If the value of the EOB counter is 6, the value of the address register 2 of the macro block index vector is decreased, and the next macro block is selected and processed by the decreased value.

(o) The above steps (k)~(n) are repeated until the value of the address register 1 of the macro block index vector coincides with the value of the CMB counter.

According to the variable-length decoding process as described above, the DCT blocks of which the variable-length decoding is possible are preferentially processed according to the order written in the DCT block index vectors, and thus it is not necessary to wait for until another DCT block is processed, with the presently decoded DCT coefficients being stored temporarily.

Figure 9:
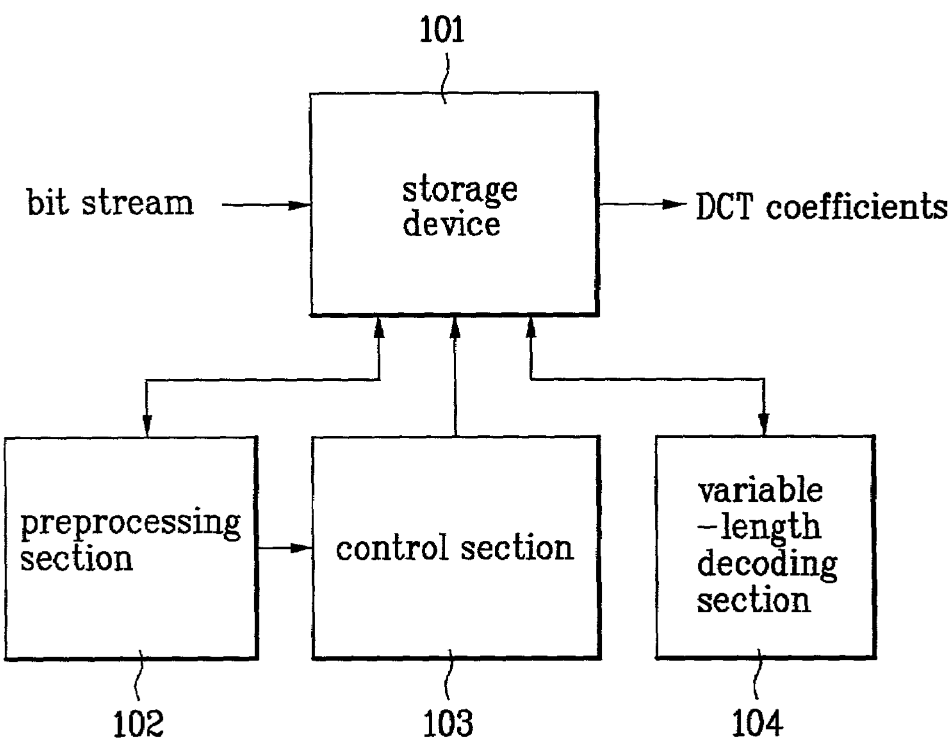
FIG. 9 is a block diagram of an apparatus for variable-length decoding an image of a DV format according to the present invention.

FIG. 9 is a block diagram of the DV-format image decoding apparatus for implementing the above-described process by hardware according to the present invention. The decoding apparatus includes a storage device 101, a preprocessing section 102, a control section, and a variable-length decoding section 104.

Figure 10:
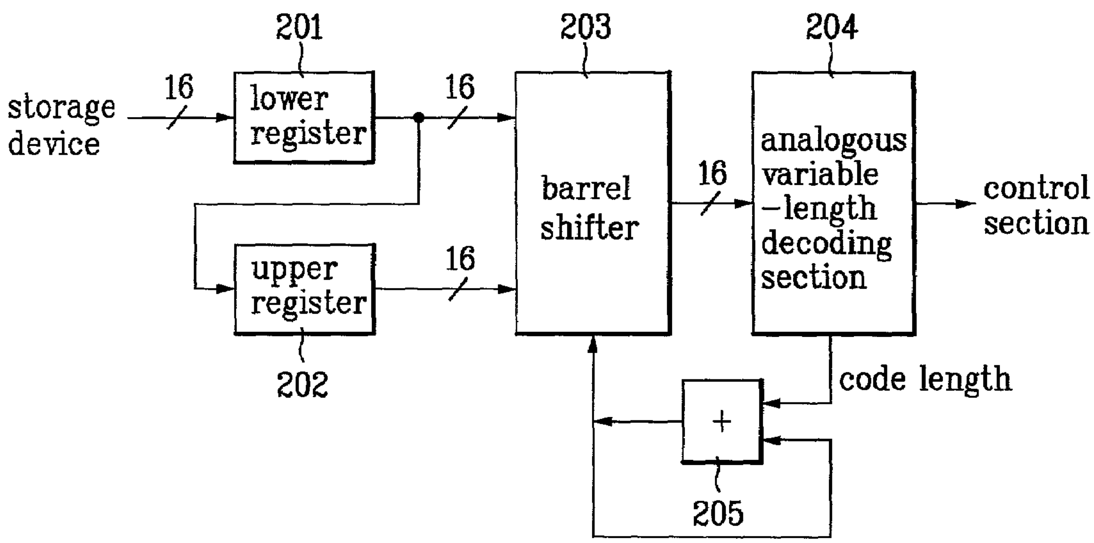
FIG. 10 is a detailed block diagram of a preprocessing section in FIG. 9.

The preprocessing section 102 is a pseudo-variable-length decoder, and includes 16-bit registers 201 and 202 and a barrel shifter 203 which are connected at the front end of a pseudo-variable-length decoding section 204 as shown in FIG. 10. The pseudo-variable-length decoding section 204 only provides whether the EOB is transmitted with respect to the inputted bit stream, and the length of the presently inputted variable-length code. At this time, in order to implement the simple preprocessing section 102, a simple code table may be prepared in accordance with the length stored in a variable-length code table.

In the control section 103 are built the DCT block index vector of FIG. 5, the macro block index vector of FIG. 6, and the bit address register of FIG. 7. The control section 103 outputs the number of the DCT block to be processed according to the value of the DCT block index vector, read and write signals. At this time, the processing order of DCT blocks that corresponds to the contents of the DCT block index vector is in the order of a complete DCT block in a complete macro block, an incomplete DCT block in a complete macro block, a complete DCT block in an incomplete macro block, and an incomplete DCT block in an incomplete macro block in the corresponding video segment.

Figure 11:
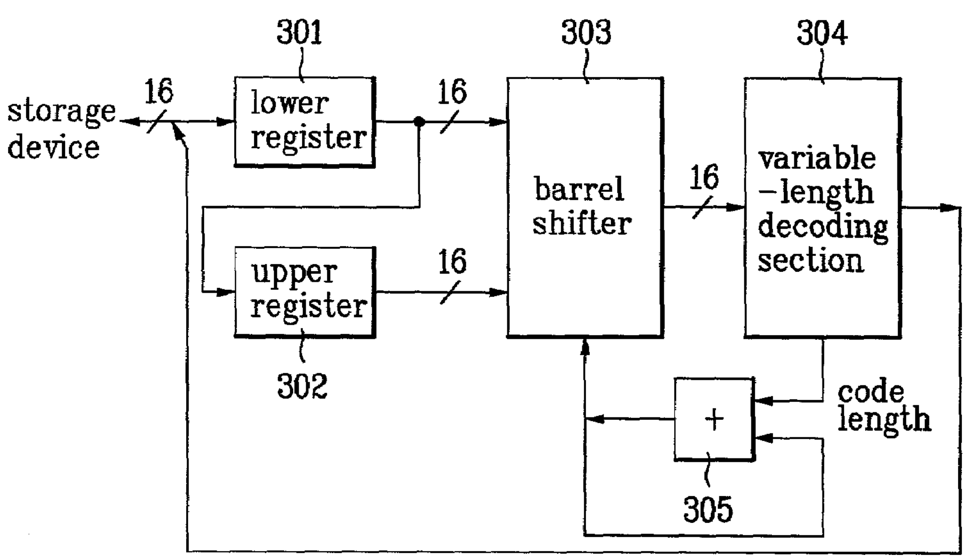
FIG. 11 is a detailed block diagram of a variable-length decoding section in FIG. 9.

The variable-length decoding section 104 may comprise the general variable-length decoder of FIG. 11 as it is.

As described above, according to the method and apparatus for decoding an image of a DV format according to the present invention, the blocks that can be processed are preferentially transmitted according to the detection of the EOB in transmitting the bit stream to the variable-length decoder by performing the preprocessing step that is the pseudo-variable-length decoding process with respect to the input bit stream when performing the decoding of the compressed image of the DV format. Thus, the delay that may be produced when the whole block is sequentially processed can be minimized.

Also, the present invention performs the decoding by redefining the processing order of the DCT blocks, and thus requires a storage device only for one DCT block in comparison to the conventional decoding method that requires a storage device for one video segment, i.e., 30 DCT blocks, in order to store data until DCT coefficients of all the DCT blocks in the video segment are obtained.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of decoding an image encoded in a digital camcorder format comprising:

a preprocessing step of detecting whether an end of block (EOB) of respective discrete cosine transform (DCT) blocks is located in basic areas allocated to the DCT block using length information of a variable-length code of an encoded bit stream of the image; and a variable-length decoding step of performing a variable-length decoding in an order of a complete DCT block in a complete macro block, an incomplete DCT block in the complete macro block, a complete DCT block in an incomplete macro block, and an incomplete DCT block in the incomplete macro block in a corresponding video segment based on the position of the EOB detected at the preprocessing step.

2. The method as claimed in claim 1, wherein when the video segment is composed of M macro blocks, a macro block is composed of N DCT blocks, and respective basic areas are allocated to the macro block and the DCT block, respectively;

the DCT block whose EOB is produced within the basic area of the DCT block is called a 'complete DCT block', and the contrary DCT block is called an 'incomplete DCT block';

the macro block where all the EOBs of N DCT blocks are produced within the basic area of the macro block is called a 'complete macro block', and the contrary macro block is called an 'incomplete macro block';

DCT block index vectors are used for separating and rearranging the complete DCT blocks and the incomplete DCT blocks; and Macro block index vectors are used for separating and rearranging the complete macro blocks and the incomplete macro blocks.

3. The method as claimed in claim 2, wherein the variable-length decoding step performs the variable-length decoding in the order of the complete DCT block in the complete macro block, the incomplete DCT block in the complete macro block, the complete DCT block in the incomplete macro block, and the incomplete DCT block in the incomplete macro block in the corresponding video segment in accordance with contents of the DCT block index vectors and the macro block index vectors.

4. The method as claimed in claim 2, wherein M DCT block index vectors are used for the macro blocks, the number of elements in the respective vector is the same as the number of the DCT blocks in the macro block, and the respective element includes a complete DCT block (CDB) counter, an EOB counter, a DCT address register 0, a DCT address register 1, and a DCT address register 2;

wherein the DCT address register 0 stores the number of the first complete DCT block having a surplus bit stream, and is used for initializing the DCT address register 1;

wherein the DCT address register 1 and the DCT address register 2 store values indicating the elements of the DCT block index vector; and wherein the CDB counter and the EOB counter count the number of complete DCT blocks and the number of EOBs in the macro block, respectively.

5. The method as claimed in claim 2, wherein the number of elements in the macro block index vector is the same as the number of the macro blocks in the video segment, and the element includes a macro block (MB) address register 1, an MB address register 2, and a complete macro block (CMB) counter;

wherein the MB address register 1 and the MB address register 2 store values indicating elements of the macro block index vector; and wherein the CMB counter counts the number of complete macro blocks in the video segment.

6. The method as claimed in claim 2, wherein the preprocessing step comprises the steps of:

initializing values of a DCT address register 1, a DCT address register 2, a complete DCT block (CDB) counter, and an EOB counter of all DCT block index vectors, and values of a macro block (MB) address register 1, an MB address register 2, and a complete macro block (CMB) counter of macro block index vector;

if the DCT block is the complete DCT block, writing a position of a bit following the EOB in a bit address register, writing the corresponding DCT block number in an element indicated by the address register in the DCT block index vector, increasing values of the address register, the CDB counter, and the EOB counter, and if the DCT block is the incomplete DCT block, resuming the process of the incomplete DCT block after reinitializing the values of the DCT address register 1 and the DCT address register 2;

if the DCT block is the incomplete block, writing a position where the decoding is stopped in the bit address register, writing the DCT block number in a position indicated by the address register 2 in the DCT block index vector, decreasing the value of the address register 2, resuming the decoding in a position indicated by the bit address register in the incomplete DCT block, and reading out a bit that exceeds the basic area subsequently from a position indicated by the bit address register of the complete DCT block; and sequentially performing the above steps with respect to the N DCT blocks in the macro block.

7. The method as claimed in claim 6, wherein the step of resuming the process of the incomplete DCT block stores an address of the vector element having the number of the incomplete DCT block to be processed in the DCT address register 2, stores an address of the vector element having the number of the completed DCT block from which the bit stream to be used for decoding the incomplete DCT block is to be read out in the DCT address register 1, reads out the bit position in which the decoding of the incomplete DCT block is to be resumed from the bit address register of the incomplete DCT block, and reads out the position in which the bit stream is to be read out from the complete DCT block from the bit address register of the complete DCT block.

8. The method as claimed in claim 6, wherein the step of resuming the process of the incomplete DCT block comprises the steps of:

if the EOB is detected from the incomplete DCT block, increasing the value of the EOB counter, and judging whether the value is smaller than N;

if it is judged that the increased value of the EOB counter is smaller than N, decreasing the value of the address register 2, selecting a new incomplete DCT block with reference to the element indicated by the value of the address register 2, and then continuing the decoding of the selected incomplete DCT block; and if it is judged that the increased value of the EOB counter is N, writing the number of the present macro block is written in the element indicated by the MB address register 1, and increasing the value of the MB address register 1 and the value of the CMB counter.

9. The method as claimed in claim 6, wherein the step of resuming the process of the incomplete DCT block comprises the steps of:

if the surplus bit stream of the basic area allocated to the complete DCT block vanishes completely, increasing the value of the DCT address register 1, and judging whether the value is smaller than the value of the CDB counter;

if it is judged that the increased value of the DCT address register 1 is smaller than the value of the CDB counter, selecting a new complete DCT block with reference to the element indicated by the value of the DCT address register 1, and continuing the decoding using the surplus bit stream of the basic area allocated to the selected complete DCT block; and if it is judged that the increased value of the DCT address register 1 is the same as the value of the CDB counter, writing the number of the present macro block in the element indicated by the MB address register 2, and decreasing the value of the MB address register 2.

10. The method as claimed in claim 2, wherein the variable-length decoding step preferentially variable-length-decodes the complete DCT block stored in a DCT address register 1 of a DCT block index vector that corresponds to the complete macro block stored in a macro block (MB) address register 1 of a macro block index vector.

11. The method as claimed in claim 2, wherein the variable-length decoding step completes the process of a complete macro block, and comprises the steps of:

(a) initializing a DCT address register 0, an address register 1, an address register 2, and an EOB counter of all the DCT block index vectors, and an address register 1 and an address register 2 of the macro block index vectors;

(b) if a completed DCT block is processed, increasing the value of the EOB counter and the value of the address register 1 of the DCT block index vector, and processing a new complete DCT block determined by the increased value of the DCT address register 1;

(c) repeating the step (b) until the value of the DCT address register 1 coincides with the value of the CDB counter;

(d) after performing the step (c), initializing the value of the DCT address register 1, and processing the incomplete DCT block by the value of the DCT address register 2 in a manner that the bit stream is read out with reference to the value of the bit address register of the incomplete DCT block to be processed, and if the bit stream of the basic area vanishes completely, the bit stream is subsequently read out from a corresponding position with reference to a bit address register of the complete DCT block selected by the DCT address register 1;

(e) if the bit stream of the basic area allocated to the complete DCT block vanishes completely, increasing the values of the DCT address register 0 and the DCT address register 1, and selecting a next complete DCT block by a value of a new DCT address register 1;

(f) if an incomplete DCT block is processed, increasing the value of the EOB counter, decreasing the value of the DCT address register 2, and processing a new incomplete DCT block determined by the DCT address register; and (g) performing the above steps (d)~(f) are performed until the value of the EOB counter becomes N, and then storing a position of a next bit where a final EOB is found in the bit address register of the present complete DCT block.

12. The method as claimed in claim 11, wherein the variable-length decoding step further comprises the steps of:

(h) if the process of a complete macro block is completed through the step (g), increasing the value of the MB address register 1 of the macro block index vector, and if the increased value is smaller than the value of the CMB counter, processing the complete macro block corresponding to the number of the macro block of the element indicated by the value of the MB address register 1;

(i) repeating the above steps (b)~(h) until the value of the MB address register 1 of the macro block index vector coincides with the value of the CMB counter;

(j) if the step (i) is performed, initializing values of the MB address register 1 of the macro block index vector and the address register 1 of all the DCT block index vectors;

(k) processing the incomplete macro block that corresponds to the number of the macro block of the element indicated by the value of the MB address register 2; and (l) repeating the step (k) until the value of the MB address register 1 of the macro block index vector coincides with the value of the CMB counter.

13. The method as claimed in claim 12, wherein the step (k) includes the steps of:

preferentially processing the complete DCT blocks by sequentially performing the steps (b) and (c), and then processing the incomplete DCT blocks by sequentially performing the steps (d)~(f);

if the value of the address register 1 of the DCT block index vector is the same as the value of the CDB counter, increasing the value of the MB address register 1 of the macro block index vector, and if the increased value is smaller than the value of the CMB counter, selecting a new complete macro block, and then selecting a new complete DCT block with reference to the value of the address register 1 of the DCT block index vector allocated to the new complete macro block to continue the decoding; and if the value of the EOB counter is N, decreasing the value of the MB address register 2 of the macro block index vector, and selecting and processing a next incomplete according to the decreased value.

14. An apparatus for decoding an image encoded in a digital camcorder format comprising:

a preprocessor for detecting a position of an end of block (EOB) of respective discrete cosine transform (DCT) blocks using length information of a variable-length code of an encoded bit stream of the image;

a variable-length decoding section for redefining a processing order of the DCT blocks according to a position of the EOB detected by the preprocessor, and performing a variable-length decoding with respect to the respective DCT blocks in the redefined processing order;

a storage device for receiving and outputting to the preprocessor the encoded bit stream, and storing and outputting the EOB of the respective DCT block outputted from the preprocessor and DCT coefficients variable-length-decoded by the variable-length decoding section; and a control section having built-in DCT block index vectors, macro block index vectors, and a bit address register to redefine a variable-length decoding order of the variable-length decoding section, and outputting to the storage device the number of the respective DCT blocks to be processed, a read signal, and a write signal in accordance with values of the DCT block index vectors.

15. The apparatus as claimed in claim 14, wherein when a video segment is composed of M macro blocks, a macro block is composed of N DCT blocks, and respective basic areas are allocated to the macro block and the DCT block, respectively, the DCT block whose EOB is produced within the basic area of the DCT block is called a 'complete DCT block', and the contrary DCT block is called an 'incomplete DCT block', the macro block where all the EOBs of N DCT blocks are produced within the basic area of the macro block is called a 'complete macro block', and the contrary macro block is called an 'incomplete macro block';

the variable-length decoding section performs the variable-length decoding in the order of the complete DCT block in the complete macro block, the incomplete DCT block in the complete macro block, the complete DCT block in the incomplete macro block, and the incomplete DCT block in the incomplete macro block in the corresponding video segment in accordance with contents of the DCT block index vectors and the macro block index vectors.

16. The apparatus as claimed in claim 14, wherein the preprocessor prepares a simple code table according to a length stored in a variable-length code table of the variable-length decoding section, and performs a pseudo-variable-length decoding accordingly.

17. The apparatus as claimed in claim 14, wherein M DCT block index vectors of the control section are used for the macro blocks in order to separate and rearrange the complete DCT blocks and the incomplete DCT blocks, the number of elements in the respective vector is the same as the number of the DCT blocks in the macro block, and the respective element includes a complete DCT block (CDB) counter, an EOB counter, a DCT address register 0, a DCT address register 1, and a DCT address register 2;

wherein the DCT address register 0 stores the number of the first complete DCT block having a surplus bit stream, and is used for initializing the DCT address register 1;

wherein the DCT address register 1 and the DCT address register 2 store values indicating the elements of the DCT block index vector; and wherein the CDB counter and the EOB counter count the number of complete DCT blocks and the number of EOBs in the macro block, respectively.

18. The apparatus as claimed in claim 14, wherein the macro block index vectors of the control section are used for separating and rearranging the complete macro blocks and the incomplete macro blocks, the number of elements in the macro block index vector is the same as the number of the macro blocks in the video segment, and the element includes a macro block (MB) address register 1, an MB address register 2, and a complete macro block (CMB) counter;

wherein the MB address register 1 and the MB address register 2 store values indicating elements of the macro block index vector; and wherein the CMB counter counts the number of complete macro blocks in the video segment.

19. The apparatus as claimed in claim 14, wherein a bit address register of the control section is used for storing a bit address where the variable-length decoding is stopped, and is allocated to each DCT block;

wherein the bit address register stores a position where the variable-length decoding is stopped (i.e., a position where the decoding is resumed at a next decoding process) in case of the incomplete DCT block; and wherein in case that an end of block (EOB) is detected from the corresponding DCT block, the bit address register stores a next bit address (i.e., a start position of a surplus bit stream).

* * * * *